(12) United States Patent
Hillis

(10) Patent No.: US 6,339,885 B1
(45) Date of Patent: Jan. 22, 2002

(54) ASTROLABE HAVING ROTATING RETE AND PLATE

(75) Inventor: W. Daniel Hillis, Toluca Lake, CA (US)

(73) Assignee: The Long Now Foundation, Sausalito, CA (US)

(*) Notice: Subject to any disclaimer, the term of this patent is extended or adjusted under 35 U.S.C. 154(b) by 0 days.

(21) Appl. No.: 09/476,865

(22) Filed: Jan. 3, 2000

(51) Int. Cl.[7] .......................... G01C 17/34; G01C 21/02
(52) U.S. Cl. ........................... 33/268; 33/1 SC; 434/289
(58) Field of Search .................. 33/268, 1 SB, 33/1 SA, 1 SC, 1 SD, 269, 430, 431; 434/284, 289

(56) References Cited

U.S. PATENT DOCUMENTS

| | | | | |
|---|---|---|---|---|
| 2,027,368 A | * | 1/1936 | Bockius | 33/431 |
| 2,304,797 A | * | 12/1942 | Collins | 33/1 SD |
| 2,337,545 A | * | 12/1943 | Collins | 33/1 SD |
| 3,035,356 A | * | 5/1962 | Musser | 33/1 SC |
| 4,513,505 A | * | 4/1985 | Young | 33/1 SD |
| 5,450,674 A | * | 9/1995 | Jen-Hu | 33/268 |

OTHER PUBLICATIONS

Geoffrey Chaucer, A *Treatise on the Astrolabe*, http://art-bin.com/art/pastro.html (Date Unknown).
A. Turner, *The Time Museum*, 1985, Rockford—Catalogue of the Collection (Month Unknown).

* cited by examiner

*Primary Examiner*—Christopher W. Fulton
(74) *Attorney, Agent, or Firm*—Michael A. Glenn; Kirk Wong

(57) ABSTRACT

In the astrolabe herein, both the rete and the plate rotate, although around different centers. The stars are drawn onto the plate, and the coordinate system is represented by the rete. In contrast to the conventional astrolabe, where the stars and the coordinate system are projected onto a plane parallel with the earth's equator, the improved astrolabe projects stars and the coordinate system using a stereographic projection onto a plane parallel with the plane of the ecliptic. This projection puts the celestial pole at the center of the rete, and the line orthogonal to the ecliptic is projected onto the center of the plate, which points about 23.5 degrees off the earth's axis. As with a conventional astrolabe, the rete is rotated to represent the sidereal motion of the stars. In contrast to the conventional astrolabe, the plate may also be rotated to represent the precession of the earth's axis. Thus, by the combined rotations of the rete and plate the correct position of the stars for any time may be indicated. Although the embodiment described here places the stars on the plate and the coordinate system on the rete, it will be apparent to anyone skilled in the art of astrolabes that the arrangement can easily be reversed, putting stars on the rete and the coordinate system on the plate.

12 Claims, 4 Drawing Sheets

ASTROLABE HAVING ROTATING RETE AND PLATE

BACKGROUND OF THE INVENTION

1. Technical Field

The invention relates to mechanical computers that can be used for performing calculations relating to the positions of the sun, stars, and other objects in the sky. More particularly, the invention relates to an improved astrolabe having a rotating rete and plate.

2. Description of the Prior Art

An astrolabe is a simple type of mechanical computer that can be used for performing calculations relating to the positions of the sun, stars, and other objects in the sky. In particular, it is useful for determining the local time from the positions of celestial objects.

The principles of the astrolabe were known in 150 B.C. (see Hipparchos). Ptolemy's text "Planisphaerium" may be connected with a kind of astrolabe. The first description of construction and use of the instrument (see Joh. Philoponos) occurs in the 6th century AD. The oldest existing astrolabes date from the 10th century and were produced by Persian astronomers. In Middle Ages, the instrument was much developed by Islamic scientists (see the Al-Sarraj-Astrolabe) and reached Latin Europe in the 11th century through Spain (see the Gothic Astrolabe).

The classical planispheric astrolabe consists of a round disk with a rim (limbus), divided into twenty-four hours, and a suspension (throne/armilla). Inside the rim (mater) are several plates (tympan) with horizontal coordinates in stereographic projection for different geographical latitudes. Above these plates rotates a celestial map (rete), in stereographic projection with star pointers and the excentric ring of the ecliptic. The back (dorsum) shows circular scales of degrees, calendar and ecliptic, a shadow square (for terrestrial measurements), and a diagram of unequal hours. Above the celestial map rotates a ruler (alhidade) with diopters for altitude-measurements.

The universal astrolabe (saphea, azarchel) needs neither a rete nor plates. It is useful for all latitudes, but it lacks the intuitive concept of the planispheric astrolabe. It shows a stereographic projection of the celestial sphere from "the side" (i.e. the vernal point). The poles are on the top and bottom of the instrument, and the rotation of the sphere is imaginative. The Al-Sarraj-Astrolabe is a combination of the planispheric (equinoctial version) and the universal instrument.

The most common astrolabe design is the planispheric astrolabe. FIG. 1 is a perspective, exploded view of a conventional astrolabe. A classical planispheric astrolabe has two main parts, the plate 10 and the rete 12. The astrolabe also consists of a backplate (mater) 21 having a raised circumference (limb) 13 on which is engraved a scale of degrees and, on Western instruments, an hour scale. At the top of the astrolabe there is a triangular or ogee-shaped projected (kursi) 27 which carries a shackle 28, through which passes a suspension ring 29. The plate and rete faced with a rule 24 and backed with an alidade 23 which may be rotated for purposes of making calculations. The entire assembly is held together by a pin 25 and horse 26.

The plate is inscribed with the coordinate system and the rete indicates the positions of various stars. The rete rotates across the plate, simulating the motion of the stars in the sky. The stars and the coordinate system are both projected onto the astrolabe using a stereographic projection onto a plane parallel with the earth's equator. This puts the celestial pole in the center, around which the rete rotates.

FIGS. 2a–2c provide a schematic diagram that illustrates the principle of stereographic projection with regard to the rete; and FIGS. 3a–3c provide a schematic diagram that illustrates the principle of stereographic projection with regard to the plate (see Ptomlemy, Planispaerium (1143) for a more detailed description of stereographic projection).

In stereographic projection (FIGS. 2a–2c), the observer's eye is imagined to be placed on the surface of the celestial sphere at one of the poles P. From this point, visual rays (represented by dotted lines) pass from the eye to the circles on the sphere. These rays cut the equinoctial plane WXYZ on which they locate the points required for the projection. From the pole P, the visual ray is projected through the two points g and h on the sphere where the ecliptic touches the tropics of Cancer and Capricorn to points G and H. These latter points coincide with the points A and F (FIGS. 3a–3c). J is the projection of the pole (j on the sphere) of the ecliptic. FIG. 2c shows the configuration obtained when the ecliptic is added to the circles projected in FIG. 2c. The actual arrangement of the rete is shown in FIG. 2a.

With regard to the plate (FIGS. 3a–3c), the observer's eye is imagined to be placed on the surface of the celestial sphere at one of the poles P. From this point, visual rays (represented by dotted lines) pass from the eye to the circles on the sphere. These rays cut the equinoctial plane WXYZ on which they locate the points required for the projection. A and B are projections on the plane of the point a and b of the tropic of Capricorn; C and D of the equator; and E and F of the tropic of Cancer. The projection thus formed results in the diagram shown in FIG. 3b, whereas the circles as they appear on the astrolabe plate are shown on FIG. 3a. The horizon-zenith coordinate system for a given latitude on earth is projected in a similar fashion onto the equinoctial plane and appears on the astrolabe plate.

See Geoffrey Chaucer, *A Treatise on the Astrolabe* (1391) for a description of the use of the conventional astrolabe. See A. J. Turner, *The Time Museum*, Vol. 1, ISBN 0-912947-02-0 (1985) for a description of more modern developments of the astrolabe.

A weakness of all classical astrolabe designs is that they assume that the stars rotate around a fixed celestial pole. These designs fail to take into the account the precession of the earth axis of rotation that occurs over a period of approximately 26,000 years. Because of this, conventional astrolabes become inaccurate with the passage of time.

It would be advantageous to provide an improved astrolabe that takes into account the precession of the earth axis of rotation.

SUMMARY OF THE INVENTION

In the improved astrolabe, both the rete and the plate rotate, although around different centers. The stars are drawn onto the plate, and the coordinate system is represented by the rete.

In contrast to the conventional astrolabe, where the stars and the coordinate system are projected onto a plane parallel with the earth's equator, the improved astrolabe projects stars and the coordinate system using a stereographic projection onto a plane parallel with the plane of the ecliptic. This projection puts the celestial pole at the center of the rete, and the line orthogonal to the ecliptic is projected onto the center of the plate, which points about 23.5 degrees off the earth's axis.

As with a conventional astrolabe, the rete is rotated to represent the sidereal motion of the stars. In contrast to the conventional astrolabe, the plate may also be rotated to represent the precession of the earth's axis. Thus, by the combined rotations of the rete and plate the correct position of the stars for any time may be indicated.

Although the embodiment described here places the stars on the plate and the coordinate system on the rete, it will be apparent to anyone skilled in the art of astrolabes that the arrangement can easily be reversed, putting stars on the rete and the coordinate system on the plate. An advantage of indicating the stars on the plate is that a larger number of stars can be conveniently shown. An advantage of putting the stars on the rete is that a coordinates can be shown in more detail.

DETAILED DESCRIPTION OF THE INVENTION

Figure 4:
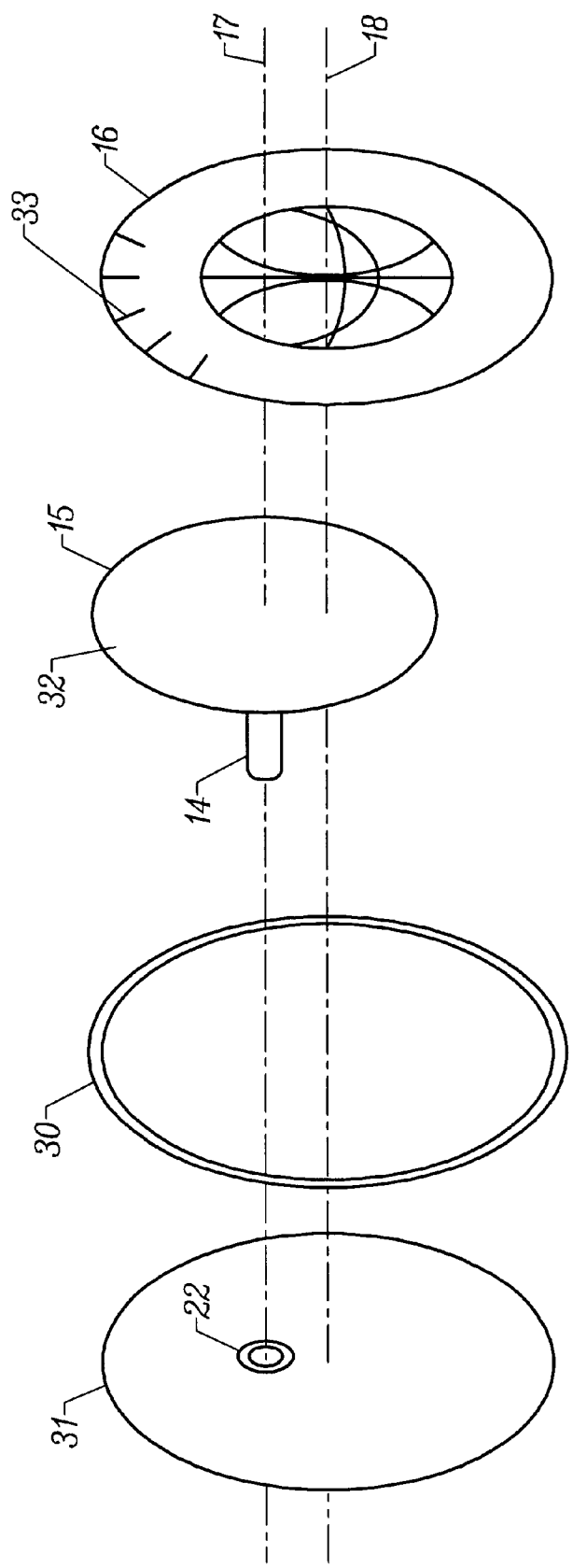
FIG. 4 is a perspective, exploded view of an improved astrolabe according to the invention.

FIG. 4 is a perspective, exploded view of an improved astrolabe according to the invention. In the improved astrolabe, both the rete 16 and the plate 15 rotate, although around different centers. Thus, the plate 15 may be rotated via a pin 14 which is engaged with an aperture 22 formed in the mater 21, while the rete 16 may be rotated within the limb 13. The stars 23 are drawn onto the plate 15, and the coordinate system 24 is represented by the rete 16. The rete 16 is preferably formed with an enlarged circumferential band, such that underlying movement of the plate 15 locates the stars 23 within the coordinate system 24 defined by the rete 16. The plate 15 and rete 16 are positioned such that an outer edge of the plate 15 is always within the coordinate system 24 defined by the rete 16. However, the centers of the plate 15 and rete 16 are offset, as discussed above.

In contrast to the conventional astrolabe, where the stars and the coordinate system are projected onto a plane parallel with the earth's equator, the improved astrolabe projects stars and the coordinate system using a stereographic projection onto a plane parallel with the plane of the ecliptic. This projection puts the celestial pole at the center of the rete, and the line orthogonal to the ecliptic is projected onto the center of the plate, which points about 23.5 degrees off the earth's axis.

As with a conventional astrolabe, the rete is rotated to represent the sidereal motion of the stars. In contrast to the conventional astrolabe, the plate may also be rotated to represent the precession of the earth's axis. Thus, by the combined rotations of the rete and plate the correct position of the stars for any time may be indicated.

Figure 1:
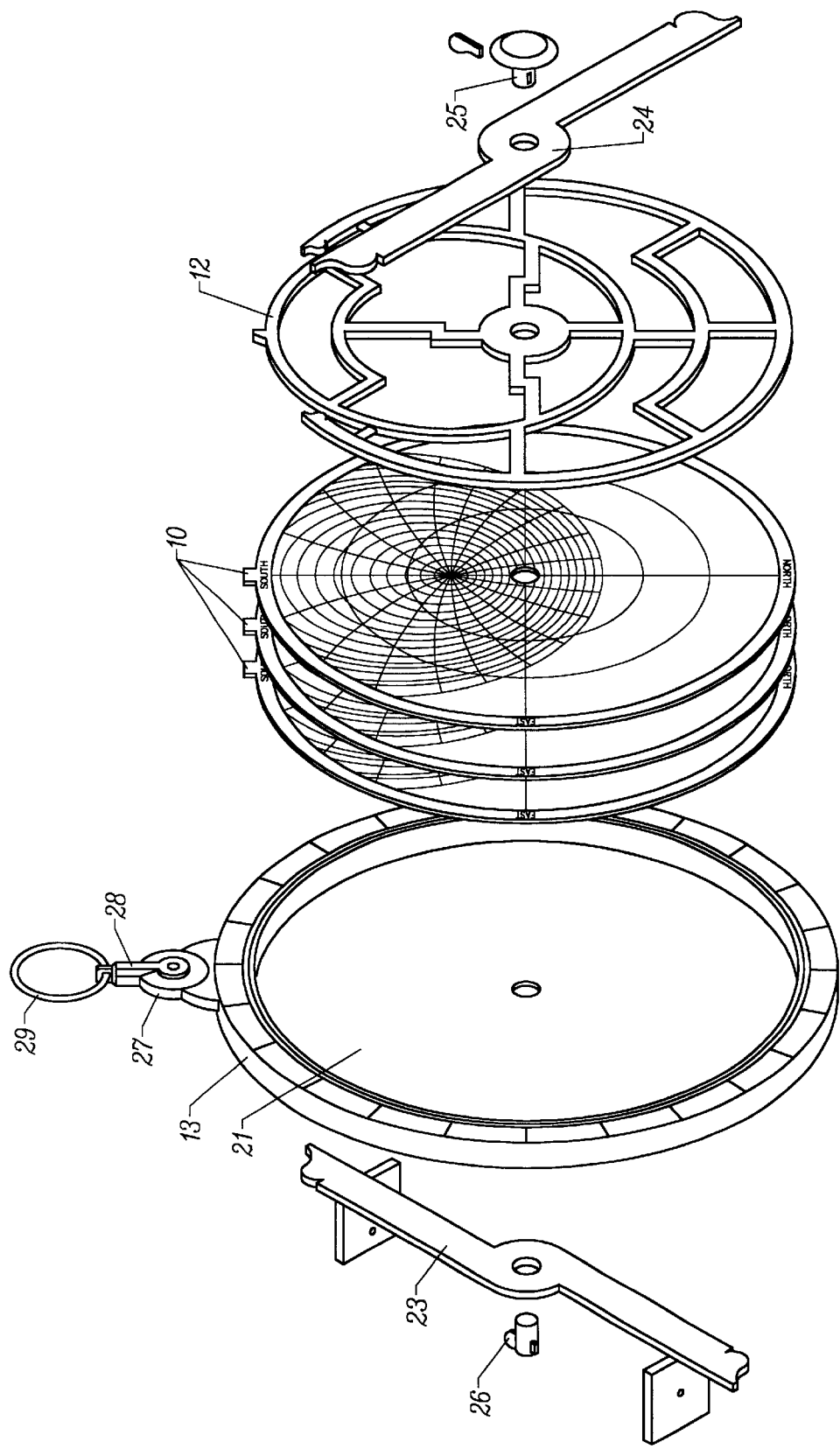
FIG. 1 is a perspective, exploded view of a conventional astrolabe.
Figure 2A:
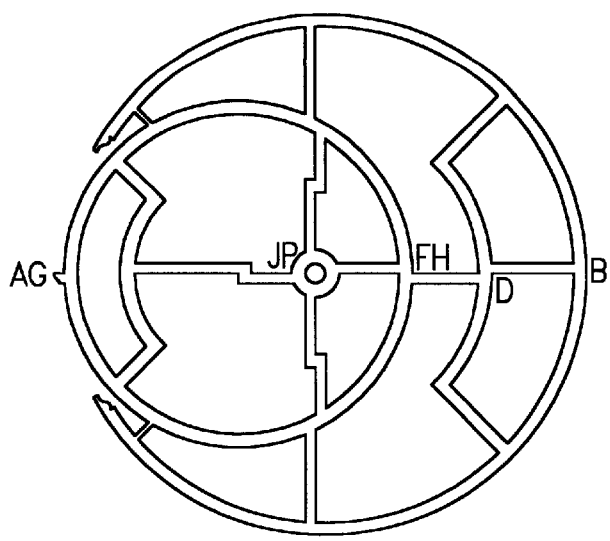
FIGS. 2a–2c provide a schematic diagram that illustrates the principle of stereographic projection with regard to the rete.
Figure 2B:
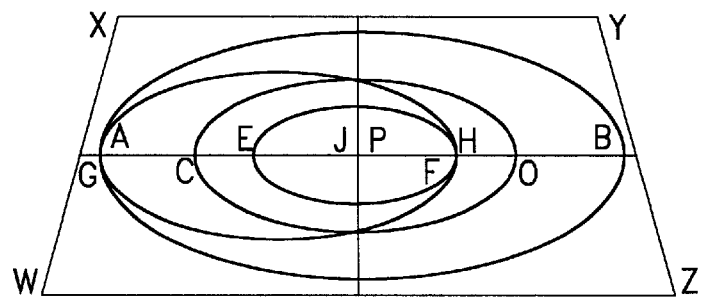
Figure 2C:
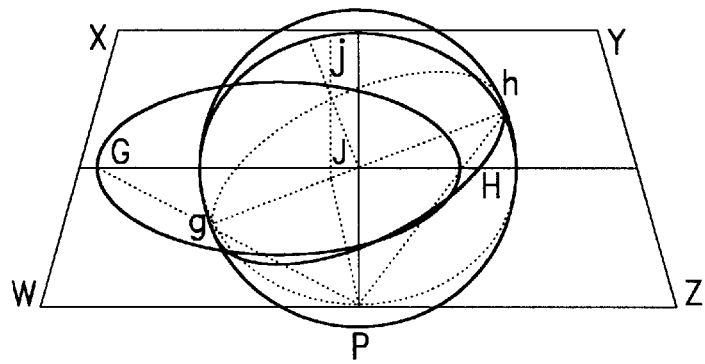
Figure 3A:
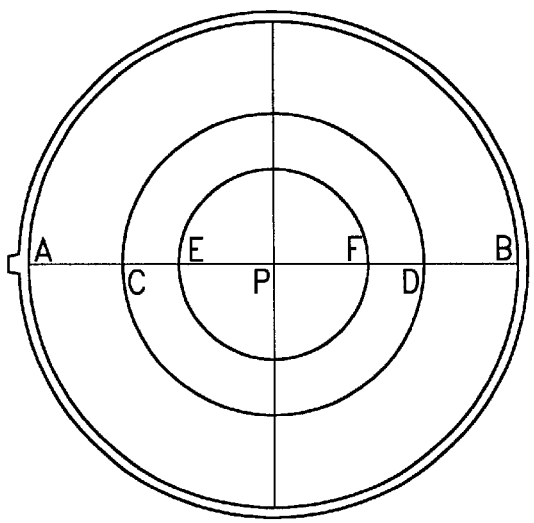
FIGS. 3a–3c provide a schematic diagram that illustrates the principle of stereographic projection with regard to the plate.
Figure 3B:
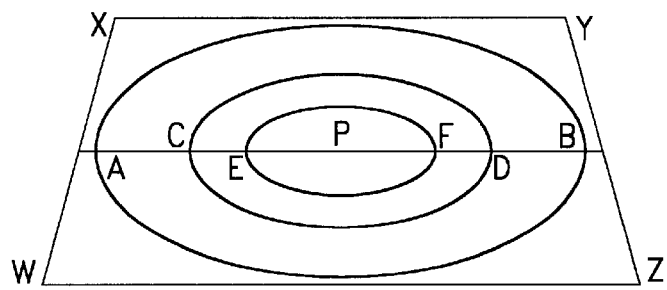
Figure 3C:
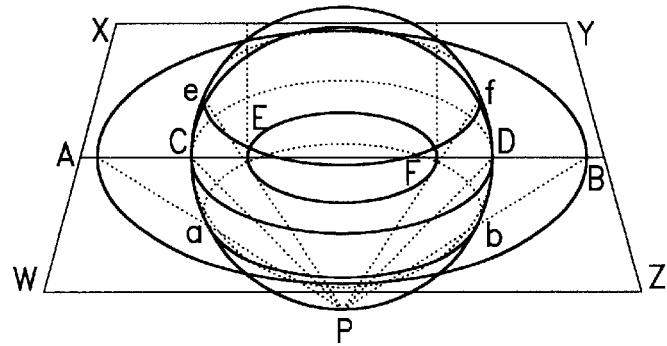

In this ecliptic-parallel projection, terrestrial coordinates lines change their projected shape as the earth rotates. Thus, the rete must show multiple coordinate lines for different times of the sidereal day. For example, the dotted lines 17, 18 shown in FIG. 3 indicate the horizon at two extremes during the course of the day. Which coordinate lines are shown on the rete depend on various factors, such as the calculations for which the astrolabe is intended to be used.

Because the projection of the ecliptic is circular, the paths of the planets, sun, and moon may be readily indicated. In an improved version of the astrolabe, additional retes are used to indicate position of planets, sun, or moon.

Although the embodiment described here places the stars on the plate and the coordinate system on the rete, it will be apparent to anyone skilled in the art of astrolabes that the arrangement can easily be reversed, putting stars on the rete and the coordinate system on the plate. An advantage of indicating the stars on the plate is that a larger number of stars can be conveniently shown. An advantage of putting the stars on the rete is that a coordinates can be shown in more detail.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An astrolabe, comprising:
    a rete rotatable about a first axis;
    a plate rotatable about a second axis;
    wherein a stereographic projection is used to project celestial bodies and a coordinate system onto a plane parallel with a plane of the ecliptic; and
    wherein a celestial pole is placed at the center of said rete, and a line orthogonal to said ecliptic is projected onto the center of said plate.

2. The astrolabe of claim 1, wherein said rete and said plate different axes.

3. The astrolabe of claim 1, wherein celestial bodies are represented on said plate.

4. The astrolabe of claim 1, wherein a coordinate system is represented on said rete.

5. The astrolabe of claim 1, wherein said rete is formed with an enlarged circumferential band, such that underlying movement of said plate locates celestial bodies on said plate within a coordinate system defined by said rete.

6. The astrolabe of claim 1, wherein said orthogonal line points about 23.5 degrees off the earth's axis.

7. The astrolabe of claim 1, wherein said plate may be rotated to represent the precession of the earth's axis.

8. The astrolabe of claim 1, wherein said rete shows multiple coordinate lines for different times of a sidereal day.

9. The astrolabe of claim 1, wherein additional retes are used to indicate position of planets, sun, or moon.

10. The astrolabe of claim 1, wherein celestial bodies are represented on said rete.

11. The astrolabe of claim 1, wherein a coordinate system is represented on said plate.

12. A method for using an astrolabe having a plate and a rete, comprising the steps of:
    providing a stereographic projection to project celestial bodies and a coordinate system onto a plane parallel with a plane of the ecliptic; and
    placing a celestial pole at the center of said rete, and a line orthogonal to said ecliptic is projected onto the center of said plate.

* * * * *